United States Patent [19]

Kreider

[11] 3,910,925

[45] Oct. 7, 1975

[54] [2-(2-METHYL-5-NITRO-1-IMIDAZOLYL)E-THYL]BENZO(B)PYRIDYLOXY ETHERS

[75] Inventor: Eunice M. Kreider, Chicago, Ill.

[73] Assignee: G. D. Searle & Co., Chicago, Ill.

[22] Filed: May 24, 1974

[21] Appl. No.: 473,145

Related U.S. Application Data

[63] Continuation-in-part of Ser. No. 288,111, Sept. 11, 1972, Pat. No. 3,828,056.

[52] U.S. Cl.......... 260/288 R; 260/309; 260/289 R
[51] Int. Cl............................................ C07d 33/50
[58] Field of Search.................... 260/288 CE, 309

[56] References Cited
UNITED STATES PATENTS 3,417,091  12/1968  Pickholz et al.............. 260/288 CE

FOREIGN PATENTS OR APPLICATIONS 5567  10/1965  France............................ 260/309

OTHER PUBLICATIONS

Blenkinsop; Chem. Abstr. Vol. 66; col. 95045t, 1967.

*Primary Examiner*—Donald G. Daus
*Assistant Examiner*—Mary C. Vaughn
*Attorney, Agent, or Firm*—John J. McDonnell

[57] ABSTRACT

Benzo(b)pyridyloxy ethers of 1-(hydroxyethyl)-5-nitroimidazole are herein described. These compounds are prepared by the reaction of hydroxybenzol(b)pyridyloxy ethers with 1-(2-chloroethyl)-2-methyl-5-nitroimidazole in aprotic polar solvents in the presence of base and sodium or potassium iodide. The compounds of this invention are effective antimicrobial agents. They are particularly effective against *Trichomonas vaginalis*.

7 Claims, No Drawings

[2-(2-METHYL-5-NITRO-1-IMIDAZOLYL)E-THYL]BENZO(B)PYRIDYLOXY ETHERS

This application is a continuation-in-part of my co-pending application Ser. No. 288,111, filed Sept. 11, 1972 now U.S. Pat. No. 3,828,056.

Compounds of the present invention are represented by the formula

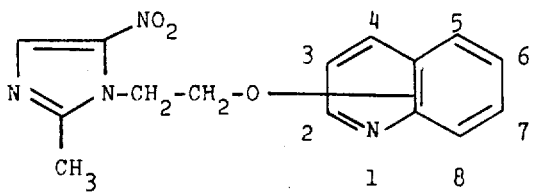

having carbon-oxygen linkage to the benzo(b)pyridyl ring in the 4 or 8-position and positions 2–8 having hydrogen or having substituents on the benzo(b)pyridyl ring wherein the 8-position is substituted with halogen, nitro, or lower alkyl containing 1–7 carbon atoms when the carbon-oxygen linkage is to the 4-position of the benzo(b)pyridyl ring and the 5-position of the benzo(b-)pyridyl ring is substituted with halogen, nitro, or lower alkyl containing 1–7 carbon atoms or the 5 and 7-positions of the benzo(b)pyridyl ring are substituted with halogen and the 2-position is substituted with lower alkyl containing 1–7 carbon atoms when the oxygen linkage is in the 8-position. Preferred embodiments are 2-methyl-5-nitro-1-[2-(4-benzo(b)pyridyloxy)ethyl]imidazole, 2-methyl-5-nitro-1-{2-[4-(8-chlorobenzo(b)pyridyloxy)]ethyl}imidazole, 2-methyl-5-nitro-1-{2-[8-(5-nitrobenzo(b)pyridyloxy)]ethyl} imidazole, and 2-methyl-5-nitro-1-{2-[8-(5,7-dichlorobenzo(b)pyridyloxy)ethyl]}imidazole.

Compounds of the formula

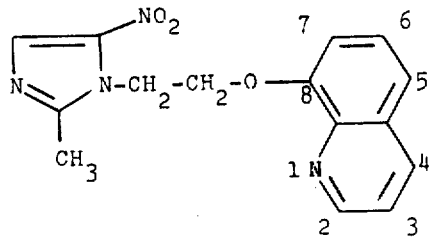

wherein the 5-position of the benzo(b)pyridyl ring is substituted with hydrogen, halogen or lower alkyl containing 1–7 carbon atoms or the 5 and 7-positions of the benzo(b)pyridyl ring are substituted with halogen and the 2-position is substituted with lower alkyl containing 1–7 carbon atoms are useful embodiments of the present invention with oxygen attached to the 8-position of the benzo(b)pyridyl ring with 2-methyl-5-nitro-1- 2-[8-(5-nitrobenzo(b)pyridyloxy)]ethyl imidazole and 2-methyl-5-nitro-1-{2-[8-(5,7-dichlorobenzo(b)pyridyloxy)]ethyl} imidazole being most preferred.

Compounds of the formula

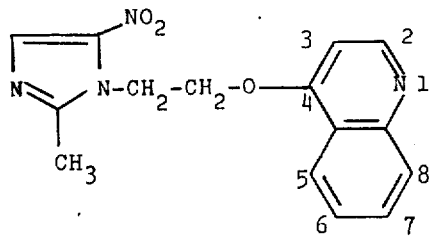

wherein the 5-position of the benzo(b)pyridyl ring is substituted with hydrogen, halogen, nitro or lower alkyl containing 1–7 carbon atoms are preferred embodiments of the present invention in which oxygen is attached to the 4-position of the benzo(b)pyridyl ring with 2-methyl-5-nitro-1-{2-[4-(8-chlorobenzo(b-)pyridyloxy)] ethyl}imidazole being most preferred.

The compounds of the present invention are heteroaryloxy ether derivatives of 1-(2-hydroxyethyl)-2-methyl-5-nitroimidazole, which is described as a potent anti-microbial agent in U.S. Pat. No. 2,944,061. The present compounds are prepared by the general method of Scheme I.

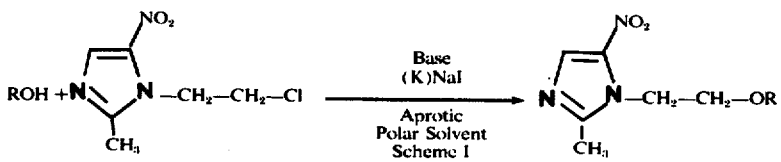

An aprotic polar solvent solution of 1-(2-chloroethyl)-2-methyl-5-nitroimidazole (J. Med. Chem. 11, 370, 1968) and sodium or potassium iodide is added to a basic aprotic polar solvent solution of a heteroaromatic alcohol. Dimethylsulfoxide, dimethylformamide, dimethylacetamide, and acetonitrile are suitable solvents and alkali metal lower alkoxide salts and sodium hydride are suitable bases. Thus a dimethylformamide solution of 1-(2-chloroethyl)-2-methyl-5-nitroimidazole and sodium iodide is added to a dimethylformamide solution of 4-hydroxy-8-chloroquinoline and sodium ethoxide to form 2-methyl-5-nitro-1-{2-[4-(8-chlorobenzo(b)pyridyloxy)]ethyl}imidazole.

The compounds of the present invention are useful in view of their anti-microbial activity. They are especially effective in inhibiting the growth of protozoa and bacteria.

Evidence of the anti-protozoal utility of the present compounds is obtained from standardized tests designed to determine the capacity of test compounds to inhibit the growth of Trichomonas vaginalis. These tests are carried out in the following manner. A modified Diamond medium is prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water. The pH is adjusted to 6.8 with 40 percent sodium hydroxide solution and 30 parts of agar (Baltimore Biological Laboratories) is incorporated. The mixture is boiled for 1 minute to dissolve the agar and is then sterilized in an autoclave. To 80 volumes of the resultant medium is aseptically added 20 volumes of sterile Dubos medium serum. The resultant medium is inoculated with 1 percent by volume of a 72 hour culture of *T. vaginalis*, whereupon 1 ml. of the inoculated medium is mixed with 10 mg. of test compound. The mixture is incubated anaerobically at 37°C. for 48 hours and then examined microscopicaly for the presence of motile trichomonads. If any are observed the compound is considered inactive. If no motile trichomonads are observed, 0.1 ml. of the incubated mixture is serially diluted and mixed with quantities of the inoculated medium sufficient to produce concentrations of 1000, 100, 10 and 1 micrograms of test compound per ml. and the resulting mixtures are incubated anaerobically as before at 37°C. for 48 hours and then examined microscopically for the presence of motile trichomonads. Controls are provided by concurrent incubations identical with the foregoing except for the absence of test compound.

Evidence of the antibacterial utility of the instant compounds is provided by standardized tests for their capacity to prevent the growth of *Bacillus subtilis*. In these tests, a mixture of 5 mg. of compound with 5 ml. of sterile nutrient broth is heated at 80°C. for 20 minutes, then cooled to around 25°C., and finally serially diluted and mixed with sufficient quantities of a mixture of sterile nutrient broth and 1 percent of a culture of *B. subtilis* to produce concentrations of approximately 400, 100, 25, and 6 mcgm. of compound per ml. The resultant mixtures are incubated for 20–24 hr. at 37°C. Controls are provided by concurrent incubations identical with the foregoing excepting that no compound is present. Activity is determined by gross examination; and potency is expressed as the minimum concentration, in mcgm. of compound per ml., at which no growth of the test organism is discernible.

The following examples are presented to further illustrate the present invention. They should not be construed as limiting it either in spirit or in scope. In these examples quantities are indicated in parts by weight unless parts by volume are specified, and temperatures are indicated in degrees Centigrade (°C.). The relationship between parts by weight and parts by volume is the same as that existing between grams and milliliters.

EXAMPLE 1

3.72 Parts of 1-(2-chloroethyl)-2-methyl-5-nitroimidazole and 3.0 parts of sodium iodide are dissolved in 40 parts by volume of dimethylformamide and the solution is added to a stirring mixture of 1.08 parts of sodium methoxide and 3.6 parts of 4-hydroxy-8-chloroquinoline in 25 parts by volume of dimethylformamide. The reaction mixture is refluxed under anhydrous conditions for 24 hours, cooled, diluted with 100 parts by volume of water. The product is extracted with chloroform and the chloroform extracts are washed with dilute sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform-hexane. This procedure provides 2-methyl-5-nitro-1-{2-[4-(8-chlorobenzo(b)pyridyloxy)]ethyl}imidazole, melting at 198°–201°. The formula of this compound is

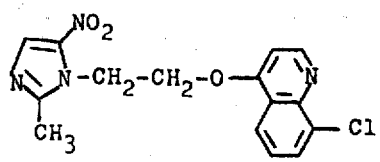

EXAMPLE 2

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.10 parts of sodium methoxide and 3.81 parts of 5-nitro-8-hydroxyquinoline in 25 parts by volume of dimethylformamide. The reaction mixture is refluxed under anhydrous conditions for 24 hours, cooled, and diluted with 100 parts by volume of water. The product is extracted with chloroform and the chloroform is removed by evaporation at reduced pressure. The resulting solid is chromatographed on neutral silica gel. Development of the column is initiated with chloroform and the product is eluted with 2 percent ethanol in chloroform. The product is treated with decolorizing charcoal and recrystallized from chloroform-hexane. This procedure provides 2-methyl-5-nitro-1-{2-[8-(5-nitrobenzo(b)pyridyloxy)]ethyl}imidazole, melting at 207.5°–208°. The formula of this compound is

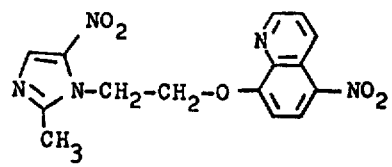

EXAMPLE 3

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.25 parts of sodium methoxide and 4.28 parts of 5,7-dichloro-8-hydroxyquinoline in 25 parts by volume of dimethylformamide. The reaction mixture is refluxed under anhydrous conditions for 24 hours, cooled, and diluted with 100 parts by volume of water. The product is extracted with dilute sodium hydroxide. The chloroform is removed by evaporation at reduced pressure and the residual solid is chromatographed on neutral silica gel. Development of the column is initiated with chloroform and the product is eluted with chloroform. The product is treated with decolorizing charcoal and recrystallized from methanol-diethyl ether. This procedure provides 2-methyl-5-nitro-1-{2-[8(5,7-dichlorobenzo(b)pyridyloxy)]ethyl}imidazole, melting at 151.5°–153°: The formula of this compound is

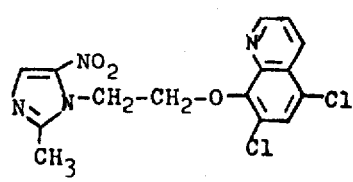

EXAMPLE 4

2.70 Parts of 1-(2-chloroethyl)-2-methyl-5-nitroimidazole and 2.14 parts of sodium iodide are dissolved in 40 parts by volume of dimethylformamide and this solution is added to a stirring mixture of 0.85 parts of sodium methoxide and 3.25 parts of 2-methyl-4-hydroxy-5,7-dichloroquinoline in 25 parts by volume of dimethylformamide The reaction mixture is refluxed under anhydrous conditions for 24 hours, cooled, and diluted with 100 parts by volume of water. The product is extracted with chloroform and the chloroform extracts are washed with dilute sodium hydroxide. The chloroform is removed by evaporation at reduced pressure and the residual solid is chromatographed on neutral silica gel. Development of the column is initiated with chloroform and the product is eluted with chloroform. The product is treated with decolorizing charcoal and recrystallized from chloroform-hexane. This procedure provides 2-methyl-5-nitro-1-{2-[8-(2-methyl-5,7-dichlorobenzo(b)pyridyloxy)]ethyl}imidazole, melting at 124°–125°. The formula of this compund is

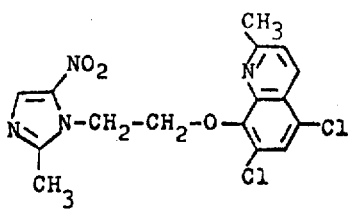

EXAMPLE 5

3.72 Parts of 1-(2-chloroethyl)-2-methyl-5-nitroimidazole and 3.0 parts of sodium iodide are dissolved in 40 parts by volume of dimethylformamide and the solution is added to a stirring mixture of 1.08 parts of sodium methoxide and 3.6 parts of 4-hydroxyquinoline in 25 parts by volume of dimethylformamide. The reaction mixture is refluxed under anhydrous conditions for 24 hours, cooled, diluted with 100 parts by volume of water. The product is extracted with chloroform and the chloroform extracts are washed with dilute sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform-hexane. This procedure provides 2-methyl-5-nitro-1-[2-(4-benzo(b)pyridyloxy)ethyl]imidazole. The formula of this compound is

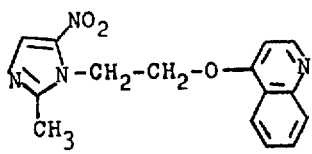

EXAMPLE 6

2.70 Parts of 1-(2-chloroethyl)-2-methyl-5-nitroimidazole and 2.15 parts of sodium iodide are dissolved in 40 parts by volume of dimethylformamide and this solution is added to a stirred mixture of 0.85 part of sodium methoxide and 3.25 parts of 2-propyl-8-hydroxy-5,7dibromoquinoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with dilute sodium hydroxide. The chloroform is removed by evaporation at reduced pressure and the residual solid is chromatographed on neutral silica gel. Development of the column is initiated with chloroform and the product is eluted with chloroform. The product is treated with decolorizing charcoal and recrystallized from chloroform-hexane. This procedure provides 2-methyl-5-nitro-1-{2-[8-(2-propyl-5,7-dibromobenzo(b)pyridyloxy)]ethyl}imidazole.
The formula of this compound is

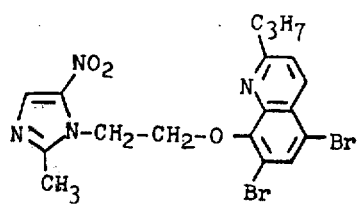

EXAMPLE 7

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.25 parts of sodium methoxide and 4.28 parts of 5,7-dibromo-8-hydroxyquinoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with dilute sodium hydroxide. The chloroform is removed by evaporation at reduced pressure and the residual solid is chromatographed on neutral silica gel. Development of the column is initiated with chloroform and the product is eluted with chloroform. The product is treated with decolorizing charcoal and recrystallized from methanol-diethyl ether. This procedure provides 2-methyl-5-nitro-1{2-[8-(5,7-dibromobenzo(b)pyridyloxy)]ethyl } imidazole. The formula of this compound is

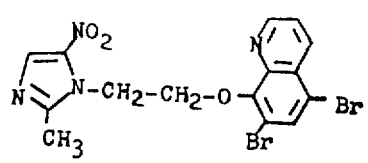

EXAMPLE 8

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.10 parts of sodium methoxide and 3.81 parts of 5-propyl-8-hydroxyquinoline in 25 parts by volume of dimethylformamide. The reaction mixture is refluxed under anhydrous conditions for 24 hours, cooled, diluted with 100 parts by volume of water. The product is extracted with chloroform and the chloroform is removed by evaporation at reduced pressure. The resulting solid is chromatographed on neutral silica gel. Development of the column is initiated with chloroform and the product is eluted with 2 percent ethanol in chloroform. The product is treated with decolorizing charcoal and recrystallized from chloroform-hexane. This procedure provides 2-methyl-5-nitro-1-{2-[8-(5-propylbenzo(b-)pyridyloxy)]ethyl} imidazole. The formula of this compound is

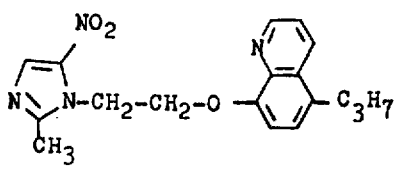

EXAMPLE 9

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.10 parts of sodium methoxide and 3.81 parts of 5-methyl-8-hydroxyquinoline in 25 parts by volume of dimethylformamide. The reaction mixture is refluxed under anhydrous conditions for 24 hours, cooled, diluted with 100 parts by volume of water. The product is extracted with chloroform and the chloroform is removed by evaporation at reduced pressure. The resulting solid is chromatographed on neutral silica gel. Development of the column is initiated with chloroform and the product is eluted with 2 percent ethanol in chloroform. The product is treated with decolorizing charcoal and recrystallized from chloroform-hexane. This procedure provides 2-methyl-5-nitro-1-{2-[8-(5-methylbenzo(b-)pyridyloxy)]ethyl} imidazole. The formula of this compound is

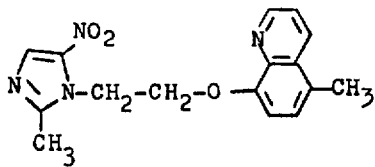

EXAMPLE 10

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.10 parts of sodium methoxide and 3.81 parts of 5-chloro-8-hydroxyquinoline in 25 parts by volume of dimethylformamide. The reaction mixture is refluxed under anhydrous conditions for 24 hours, cooled, and diluted with 100 parts by volume of water. The product is extracted with chloroform and the chloroform is removed by evaporation at reduced pressure. The resulting solid is chromatographed on neutral silica gel. Development of the column is initiated with chloroform and the product is eluted with 2 percent ethanol in chloroform. The product is treated with decolorizing charcoal and recrystallized from chloroform-hexane. This procedure provides 2-methyl-5-nitro-1-{2-[8-(5-chlorobenzo(b-)pyridyloxy)]ethyl} imidazole. The formula of this compound is

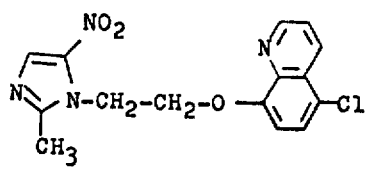

EXAMPLE 11

3.72 Parts of 1-(2-chloroethyl)-2-methyl-5-nitroimidazole and 3.0 parts of sodium iodide are dissolved in 40 parts by volume of dimethylformamide and this solution is added to a stirring mixture of 1.10 parts of sodium methoxide and 3.81 parts of 5-bromo-8-hydroxyquinoline in 25 parts by volume of dimethylformamide. The reaction mixture is refluxed under anhydrous conditions for 24 hours, cooled, and diluted with 100 parts by volume of water. The product is extracted with chloroform and the chloroform is removed by evaporation at reduced pressure. The resulting solid is chromatographed on neutral silica gel. Development of the column is initiated with chloroform and the product is eluted with 2 percent ethanol in chloroform. The product is treated with decolorizing charcoal and recrystallized from chloroform-hexane. This procedure provides 2-methyl-5-nitro-1-{2-[8-(5-bromobenzo(b-)pyridoxy)]ethyl}imidazole. The formula of this compound is

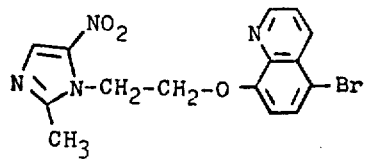

EXAMPLE 12

3.72 Parts of 1-(2-chloroethyl)-2-methyl-5-nitroimidazole and 3.0 parts of sodium iodide are dissolved in 40 parts by volume of dimethylformamide and this solution is added to a stirred mixture of 1.08 parts of sodium methoxide and 3.6 parts of 4-hydroxy-8-nitroquinoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with dilute sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform-hexane. This procedure provides 2-methyl-5-nitro-1-{2-[4-(8-nitrobenzo(b)pyridyloxy)]ethyl}imidazole. The formula of this compound is

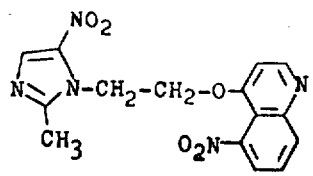

EXAMPLE 13

3.72 Parts of 1-(2-chloroethyl)-2-methyl-5-nitroimidazole and 3.0 parts of sodium iodide are dissolved in 40 parts by volume of dimethylformamide and this solution is added to a stirred mixture of 1.08 parts of sodium methoxide and 3.6 parts of 4-hydroxy-8-propylquinoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with dilute sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform hexane. This procedure provides 2-methyl-5-nitro-1-{2-[4-(8-propylbenzo(b)pyridyloxy)]ethyl}imidazole. The formula of this compound is

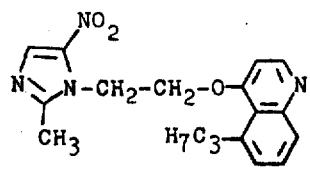

EXAMPLE 14

3.72 Parts of 1-(2-chloroethyl)-2-methyl-5-nitroimidazole and 3.0 parts of sodium iodide are dissolved in 40 parts by volume of dimethylformamide and this solution is added to a stirred mixture of 1.08 parts of sodium methoxide and 3.6 parts of 4-hydroxy-8-methylquionoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with dilute sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform-hexane. This procedure provides 2-methyl-5-nitro-1-{2-[4-(8-methylbenzo(b)pyridyloxy)]ethyl}imidazole. The formula of this compound is

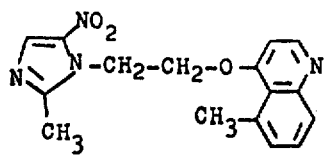

EXAMPLE 15

3.72 Parts of 1-(2-chloroethyl)-2-methyl-5-nitroimidazole and 3.0 parts of sodium iodide are dissolved in 40 parts by volume of dimethylformamide and this solution is added to a stirred mixture of 1.08 parts of sodium methoxide and 3.6 parts of 4-hydroxy-8-bromoquinoline in 25 parts by volume of dimethylformamide. The reaction mixture is refluxed under anhydrous conditions for 24 hours, cooled, and diluted with 100 parts by volume of water. The product is extracted with chloroform and the chloroform extracts are washed with diluted sodium hydroxide. The chloroform solution is dried over anhydrous sodium sulfate and then one-half of the solvent is removed by evaporation at reduced pressure. The addition of hexane causes precipitation of the product. The product is treated with decolorizing charcoal and recrystallized from chloroform-hexane. This procedure provides 2-methyl-5-nitro-1-{2-[4-(8-bromobenzo(b)pyridyloxy)]ethyl}imidazole. The formula of this compound is

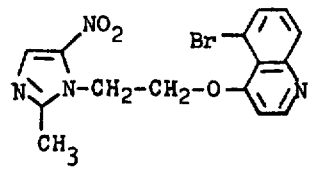

What is claimed is:
1. A compound of the formula

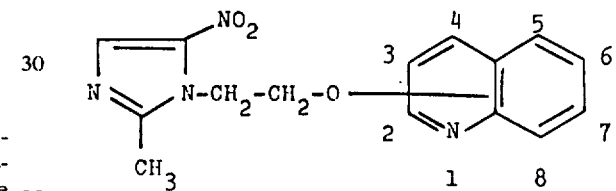

having carbon-oxygen linkage to the benzo(b)pyridyl ring in the 4 or 8-position and positions 2–8 having hydrogen or having substituents on the benzo(b)pyridyl ring wherein the 8-position is substituted with halogen, nitro, or lower alkyl having 1–7 carbon atoms when the carbon-oxygen linkage is to the 4-position of the benzo(b)pyridyl ring and the 5-position of the benzo(b)pyridyl ring is substituted with halogen, nitro, or lower alkyl having 1–7 carbon atoms or the 5 and 7 -positions of the benzo(b)pyridyl ring are substituted with halogen and the 2-position is substituted with lower alkyl having 1–7 carbon atoms when the oxygen linkage is in the 8-position.

2. As in claim 1, a compound of the formula

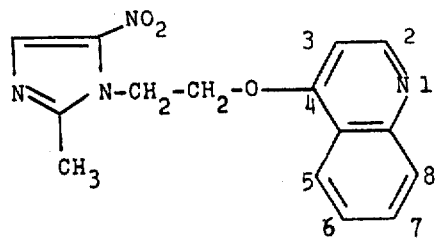

wherein the 5-position of the benzo(b)pyridyl ring is substituted with hydrogen, halogen, nitro or lower alkyl having 1–7 carbon atoms.

3. As in claim 1, a compound of the formula

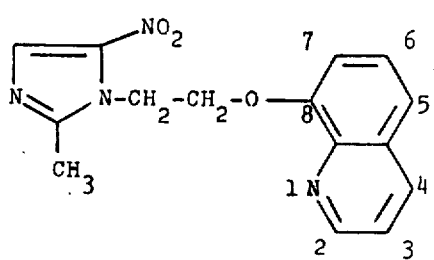

wherein the 5-position of the benzo(b)pyridyl ring is substituted with hydrogen, halogen or lower alkyl having 1–7 carbon atoms or the 5 and 7-positions of the benzo(b)pyridyl ring are substituted with halogen and the 2-position is substituted with lower alkyl having 1–7 carbon atoms.

4. As in claim 1, the compound which is 2-methyl-5-nitro-1-{2-[4-(8-chlorobenzo(b)pyridyloxy)]ethyl}imidazole.

5. As in claim 1, the compound which is 2-methyl-5-nitro-1-{2-[8-(5-nitrobenzo(b)pyridyloxy)]ethyl}imidazole.

6. As in claim 1, the compound which is 2-methyl-5-nitro-1-{2-[8-(5,7-dichlorobenzo(b)pyridyloxy)]ethyl}imidazole.

7. As in claim 1, the compound which is 2-methyl-5-nitro-1-{2-[8-(2-methyl-5,7-dichlorobenzo(b)pyridyloxy)]ethyl}imidazole.

* * * * *